July 25, 1933.  R. M. PAGE ET AL  1,919,251
FREQUENCY DIVISION SYSTEM
Filed Dec. 24, 1930

Inventors
Robert M. Page,
Westley F. Curtis,
BY Robert A. Lavender
ATTORNEY.

Patented July 25, 1933

1,919,251

UNITED STATES PATENT OFFICE

ROBERT M. PAGE AND WESTLEY F. CURTIS, OF WASHINGTON, DISTRICT OF COLUMBIA

FREQUENCY DIVISION SYSTEM

Application filed December 24, 1930. Serial No. 504,604.

(GRANTED UNDER THE ACT OF MARCH 3, 1883, AS AMENDED APRIL 30, 1928; 370 O. G. 757)

Our invention relates broadly to frequency division and more particularly to a circuit arrangement employing a gas tube for effecting a division in the frequency of energy applied to the circuit of the tube.

One of the objects of our invention is to provide a circuit arrangement for an oscillator including a gaseous discharge tube for effecting a division in frequency of the energy applied to the circuit of the gaseous discharge tube.

Another object of our invention is to provide a glow discharge tube for effecting division in frequency of energy applied to the glow discharge tube circuit.

Still another object of our invention is to provide a circuit arrangement for a neon tube having provision for dividing the frequency of the energy applied to the tube circuit and delivering the divided frequency to an output system.

Figure 1:
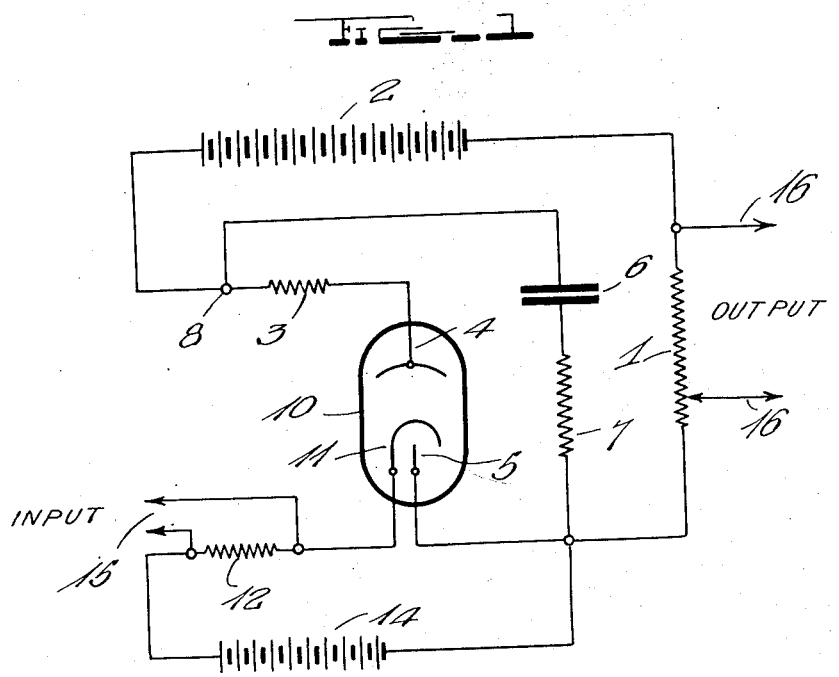
Figure 2:
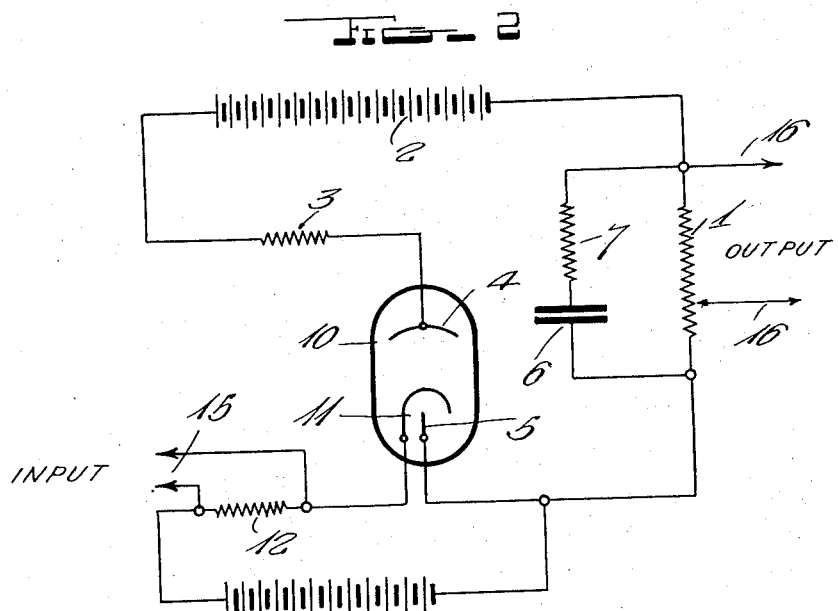

Other and further objects of our invention reside in a circuit arrangement for a glow discharge tube having means for effecting a division in frequency of energy applied thereto as will be more fully set forth in the specification hereinafter following by reference to the accompanying drawing, wherein:

Figure 1 illustrates one circuit arrangement embodying our invention; and Fig. 2 illustrates a modified circuit arrangement embodying our invention.

Our invention is directed to a frequency division circuit employing a three electrode tube where the electrodes are immersed in a gas at low pressure operating as a glow discharge tube. A neon tube may be employed in the circuit arrangement of our invention and connected for the production of oscillations in accordance with the circuits shown in Figs. 1 and 2.

A neon tube oscillator works between two critical voltages, the so-called upper and lower critical voltages. In the usual arrangement the neon tube is connected in parallel with the condenser and the combination is connected to a battery through a resistance. This arrangement is represented in Fig. 1 wherein reference character 1 designates an output circuit resistance connected in series with battery 2 and to the anode 4 through resistance 3. The electrodes 4 and 5 are the electrodes of the tube between which the discharge takes place, the electrode 5 constituting a cathode. An auxiliary circuit including a condenser 6 and a resistance 7 is connected between electrode 5 and a point 8 in the anode circuit as shown. When the battery is first connected to the circuit, condenser 6 begins to charge through resistance 7 according to the well known exponential law. If battery 2 is sufficiently large, at a definite time $t_o$ the voltage across the condenser reaches a value which will cause the tube to flash over. This value is called the upper critical voltage. When the tube 10 flashes, the condenser discharges through the tube. If resistance 1 is sufficiently large, it will so limit the current furnished from the potential source 2 that the voltage across the condenser falls so low that the discharge is no longer maintained. This voltage is called the lower critical voltage. When this voltage is reached the discharge ceases and the condenser begins to charge up again, reaching the upper critical voltage at a certain time $t_1$. The cycle is thus complete and repeats itself with a period:

$$T = t_1 - t_o$$

The use of the third or control electrode 11 and its associated circuit can now be explained. Small changes in the potential of this auxiliary electrode 11 produce large changes in the critical voltages. Accordingly the third electrode 11 is connected through coupling resistance 12 and battery 14 to electrode 5 of the tube 10. The value of 14 is so adjusted that the critical voltages have convenient values. A sufficient voltage of the frequency which is to be divided is impressed across resistance 12 constituting the input circuit to the system. Now when the voltage across condenser 6 is rising towards the upper critical voltage, a voltage peak on grid electrode 11 will lower the critical voltage until it equals the voltage across the condenser, starting the discharge. A definite number of cycles later, another voltage peak on grid electrode 11 again starts the discharge. Hence the period of the neon tube oscillator is an integral multiple of the period of the voltage impressed on 12, and the frequency of the neon tube oscillator must be the frequency of this impressed voltage divided by an integer. The neon tube oscillator will function in a manner similar to the above if the condenser is connected across the resistance instead of across the tube. Fig. 2 shows an arrangement similar to Fig. 1 except that the condenser 6 is connected across the output resistance 1 in series with resistance 7 as shown. This circuit also functions as a frequency divider. Resistance 3 and 7 may be given whatever value is found to yield most satisfactory operation.

The energy on which the circuits must operate for effecting a division in frequency is introduced at the terminals 15 marked input, while the energy which has been divided is withdrawn at the circuit terminals marked 16 constituting the output system of the circuit arrangement of our invention. The energy which is applied at circuit terminals 15 across the potentiometer or resistance 12 controls the operation of the frequency division circuit in the manner heretofore described.

While we have described our invention in certain preferred embodiments, we desire that it be understood that modifications may be made and that no limitations upon our invention are intended other than are imposed by the scope of the appended claims.

The invention herein described may be manufactured and used by or for the Government of the United States of America for governmental purposes without the payment of any royalties thereon.

What we claim as new and desire to secure by Letters Patent of the United States is as follows:

1. A frequency division circuit comprising a gas discharge tube including a cathode, an anode and a control electrode, an input circuit connected between said cathode and said control electrode of said gas discharge tube, a source of constant potential connected in said input circuit, a resistance element in said input circuit, an output circuit connected between said cathode and said anode of said gas discharge tube, a source of potential connected in said output circuit, a resistance element in said output circuit, an auxiliary circuit connected between said cathode and said anode, said auxiliary circuit including a condenser connected to discharge across said cathode and anode for effecting a division in frequency of energy applied across the resistance in said input circuit, and means for deriving energy at said divided frequency across the resistance in said output circuit.

2. In a frequency division system, a gas discharge tube including a cathode, an anode and a control electrode, an input system connected between said cathode and said control electrode of said gas discharge tube, a source of constant potential connected in said input circuit, a resistance element in said input circuit, an output system connected between said cathode and said anode of said glow discharge tube, a source of potential connected in said output circuit, a resistance element in said output circuit, and an auxiliary circuit connected between said cathode and said anode, said auxiliary circuit including a condenser operating to discharge across said cathode and anode at a predetermined critical voltage under charging conditions from said input circuit for effecting a division in frequency of the energy applied across the resistance in said input circuit and means for deriving energy at said divided frequency across the resistance in said output circuit.

3. A frequency division system comprising a gaseous discharge tube including a cathode, an anode and a control electrode, an input circuit connected across said cathode and control electrode, a resistance disposed in series in said input circuit, a circuit for applying the energy adapted to be acted upon by the frequency division process across said resistance, an output circuit connected across said anode and cathode, said output circuit including a resistance and a source of potential connected in series, an auxiliary circuit connected with said cathode and anode, said auxiliary circuit including an impedance element and condenser disposed in series, said condenser operating to receive a charge from said source of potential for discharging across said anode and cathode for effecting a frequency division of the energy applied to said input circuit and means for transferring energy of divided frequency from said output circuit.

4. A frequency division system comprising a gaseous discharge tube including a cathode, anode and control electrode, an input circuit connected across said cathode and control electrode, an output circuit connected with said anode and cathode, a resistance in said input circuit, means for applying energy to said input circuit across said resistance, a source of potential and a resistance in said output circuit, an auxiliary circuit connected across said cathode and anode, said auxiliary circuit including a condenser and an impedance connected in series, said condenser being adapted to receive a charge from said source of potential and discharge at a predetermined critical voltage across said anode and cathode under conditions limited by the value of said impedance for effecting a division in frequency of the impressed energy, and means for deriving the energy of divided frequency across said resistance in said output circuit.

5. In a frequency division system, a gaseous discharge tube including a cathode, an anode and a control electrode, an input circuit including a source of fixed potential, a resistance in series with said source of potential, a circuit for impressing energy across said resistance for discharge across said tube, an output circuit connected with said cathode and anode and including a source of potential for ionizing the path between said electrodes, a resistance in said output circuit, and an auxiliary circuit connected between said cathode and anode, said auxiliary circuit including a condenser and a series connected impedance, said condenser operating to receive a charge sufficient to produce a potential equal to the upper critical voltage of said tube and effecting a division in frequency of the applied potential and connections to the resistance in said output circuit for receiving the energy subsequent to said frequency division operation.

ROBERT M. PAGE.
WESTLEY F. CURTIS.